US010072993B2

(12) United States Patent
Reigosa et al.

(10) Patent No.: US 10,072,993 B2
(45) Date of Patent: Sep. 11, 2018

(54) TORQUE ESTIMATING SYSTEM FOR SYNCHRONOUS ELECTRIC MOTOR

(71) Applicant: NISSAN MOTOR CO., LTD., Yokohama-shi, Kanagawa-ken (JP)

(72) Inventors: David Díaz Reigosa, Asturias (ES); Fernando Briz Del Blanco, Asturias (ES); Hideo Yoshida, Fujisawa (JP); Takashi Kato, Fujisawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 585 days.

(21) Appl. No.: 14/450,797

(22) Filed: Aug. 4, 2014

(65) Prior Publication Data

US 2015/0198491 A1    Jul. 16, 2015

(30) Foreign Application Priority Data

Jan. 13, 2014 (EP) .................................... 14380001

(51) Int. Cl.
*G01L 1/00* (2006.01)
*G01L 3/00* (2006.01)
(Continued)

(52) U.S. Cl.
CPC ................ *G01L 3/00* (2013.01); *H02K 11/24* (2016.01); *H02K 11/25* (2016.01); *H02P 21/20* (2016.02); *H02P 29/67* (2016.11)

(58) Field of Classification Search
CPC . G01L 3/00; H02K 11/24; H02P 21/20; H02P 29/67
See application file for complete search history.

(56) References Cited

U.S. PATENT DOCUMENTS

| 6,801,011 B2 | 10/2004 | Ide |
| 7,774,148 B2 | 8/2010 | Welchko et al. |
| 2004/0113582 A1 | 6/2004 | Ide |

(Continued)

FOREIGN PATENT DOCUMENTS

| CN | 101295954 A | 10/2008 |
| JP | 10-028354 A | 1/1998 |

(Continued)

OTHER PUBLICATIONS

Francesco Cupertino, et al., "Sensorless position control of permanent magnet motors with pulsating current injection and compensation of motor end-effects", IEEE, 2011, ISSN 0093-9994.*

(Continued)

*Primary Examiner* — Matthew G Marini
(74) *Attorney, Agent, or Firm* — Foley & Lardner LLP

(57) ABSTRACT

A torque estimating system for a synchronous electric motor having a permanent magnet includes: a superimposing unit configured to superimpose a voltage or current of a frequency different from a frequency of a fundamental wave driving the synchronous electric motor on at least a d-axis of the synchronous electric motor; a magnet temperature estimating unit configured to estimate a temperature of the permanent magnet from the superimposed voltage or current and a current or voltage obtained by the superimposing; and a torque estimating unit configured to estimate a torque of the synchronous electric motor from the estimated temperature of the permanent magnet.

12 Claims, 11 Drawing Sheets

(51) Int. Cl.
  *H02K 11/24* (2016.01)
  *H02K 11/25* (2016.01)
  *H02P 21/20* (2016.01)
  *H02P 29/60* (2016.01)

(56) References Cited

U.S. PATENT DOCUMENTS

| | | | | |
|---|---|---|---|---|
| 2008/0111516 | A1* | 5/2008 | Inokuma | H02P 21/14 318/799 |
| 2008/0183405 | A1 | 7/2008 | Welchko et al. | |
| 2009/0033260 | A1* | 2/2009 | Fernengel | H02P 23/14 318/400.07 |
| 2009/0189561 | A1* | 7/2009 | Patel | H02H 7/0852 318/806 |
| 2010/0204862 | A1 | 8/2010 | Uejima et al. | |
| 2013/0249448 | A1* | 9/2013 | Kobayashi | H02P 21/141 318/400.02 |

FOREIGN PATENT DOCUMENTS

| | | |
|---|---|---|
| JP | 2002-291283 A | 10/2002 |
| JP | 2009-083583 A | 4/2009 |

OTHER PUBLICATIONS

David Diaz Reigosa et al., Magnet Temperature Estimation in Surface PM Machines Using High-Frequency Signal Injection, IEEE Transactions on Industry Applications, vol. 46, No. 4, Jul. 2010, pp. 1468-1475.

European Extended Search Report, dated Jul. 15, 2014, 7 pages.

Jun Liao, "Research on PMSM Speed Sensorless Control Strategy based on High Frequency Signal Injection," Chinese Master's Dissertations Full-Text Database (CMFD), pp. 55-61, Apr. 15, 2011 (with English translation).

* cited by examiner

TORQUE ESTIMATING SYSTEM FOR SYNCHRONOUS ELECTRIC MOTOR

BACKGROUND OF THE INVENTION

Field of the Invention

The present invention relates to a torque estimating system for a synchronous electric motor.

Description of the Related Art

A permanent magnet synchronous electric motor is known in which permanent magnets are disposed in a rotor and the rotor is rotated by an interaction between the permanent magnets and a rotating magnetic field generated by a stator. As a method of detecting the torque of such an electric motor, Patent Literature 1 (Japanese Patent Application Publication No. Hei 10-28354) discloses a method of detecting the torque by using a torque sensor.

However, attaching the torque sensor to a rotating part of the electric motor as described in Patent Literature 1 may reduce the durability and reliability of the electric motor. Moreover, attaching the torque sensor increases the cost.

The present invention has been made in view of the problem described above and an object thereof is to provide a torque estimating system for a synchronous electric motor which can accurately estimate the torque of the electric motor in a wide operation range from zero speed to a high number of revolutions of the electric motor, without using a torque sensor.

SUMMARY OF THE INVENTION

A torque estimating system for a synchronous electric motor according to one aspect of the present invention superimposes a voltage or current of a frequency different from a frequency of a fundamental wave driving the synchronous electric motor on at least a d-axis of the synchronous electric motor, estimates a temperature of the permanent magnet from the superimposed voltage or current and a current or voltage obtained by the superimposing, and estimates a torque of the synchronous electric motor from the estimated temperature of the permanent magnet.

DESCRIPTION OF THE EMBODIMENTS

Embodiments of the present invention will be described below with reference to the drawings.

[First Embodiment]

Figure 1:
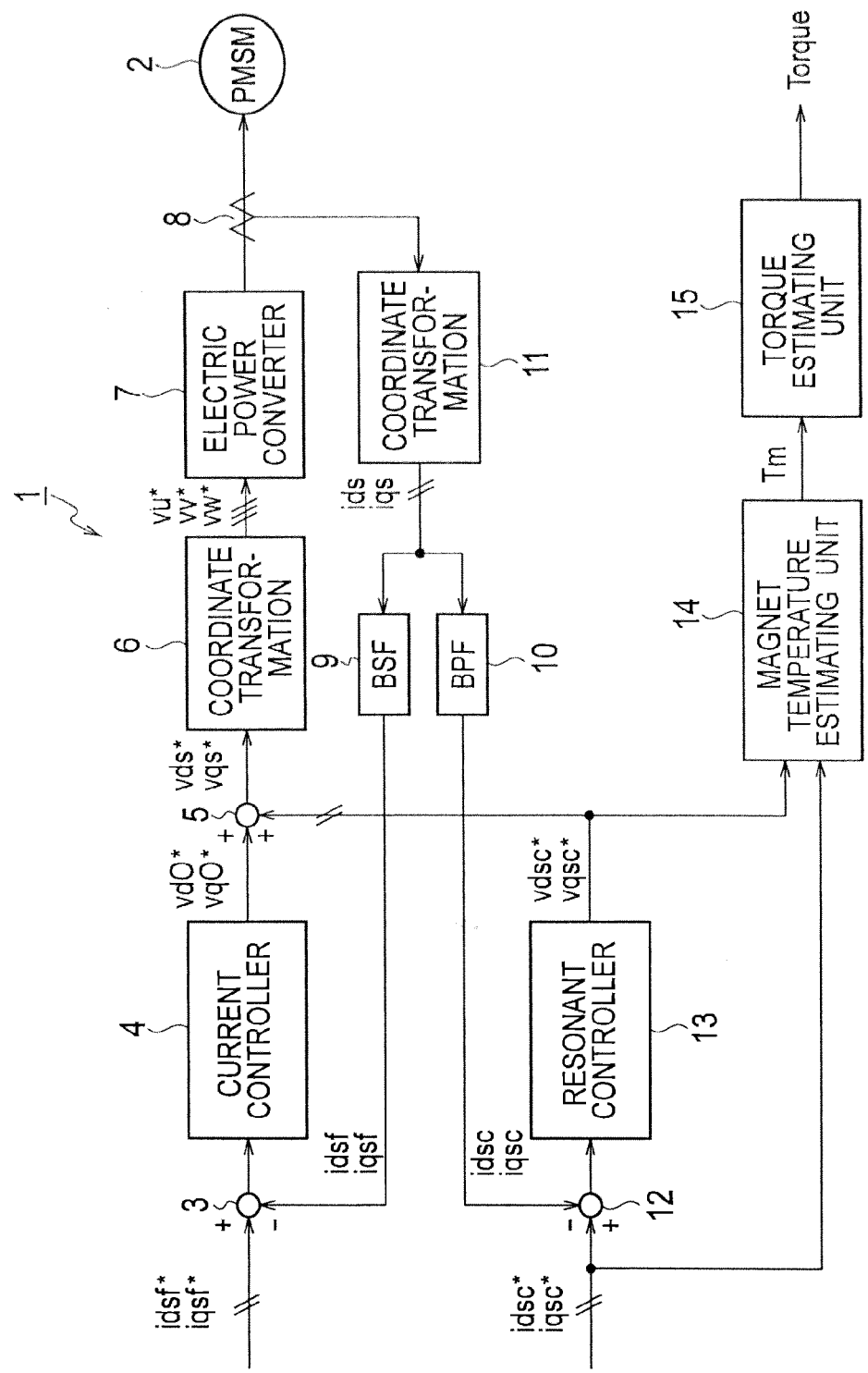
FIG. 1 is a system configuration diagram of a control device for a permanent magnet synchronous electric motor in a first embodiment of the present invention.

FIG. 1 is a system configuration diagram of a control device for a permanent magnet synchronous electric motor in a first embodiment of the present invention. As shown in FIG. 1, the control device 1 for a permanent magnet synchronous electric motor includes a current controller 4, coordinate transformations 6 and 11, an electric power converter 7, a band-stop filter 9, a band-pass filter 10, a resonant controller 13 a magnet temperature estimating unit 14 and, torque estimating unit 15 to control an electric motor 2. Note that, in the drawings, two oblique lines indicate two-dimensional vectors and three oblique lines indicate three-dimensional vectors.

Figure 2:
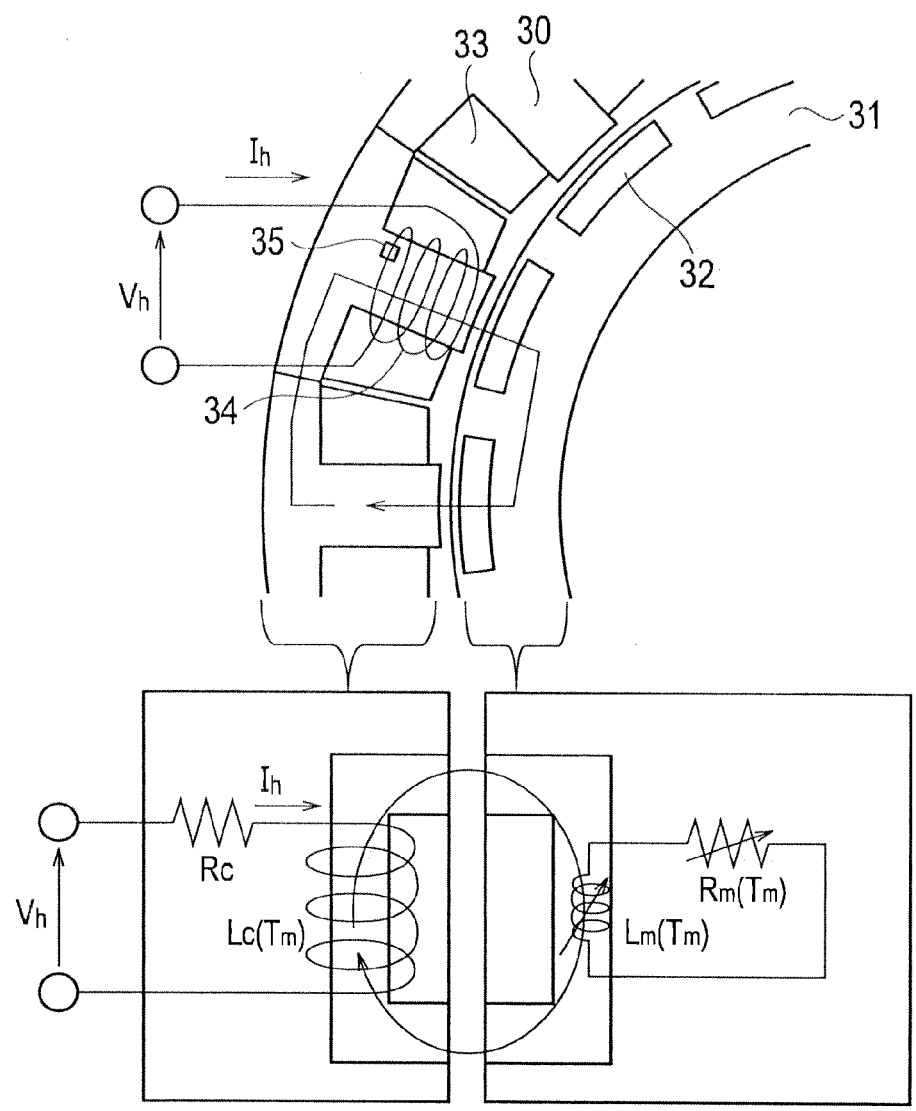
FIG. 2 is a view for explaining principles of permanent magnet temperature estimation in the first embodiment of the present invention.

As shown in FIG. 2, the electric motor 2 is a three-phase permanent magnet synchronous motor (PMSM) and is configured such that a rotor 31 including permanent magnets 32 rotate inside a stator 30. Multiple slots 33 are provided in the stator 30 and a stator coil 34 are wound in each of the slots 33. A current magnetic flux is generated by supplying a three-phase electric power to the stator coil 34 and each of the permanent magnets 32 generates magnet magnetic flux. Note that a temperature sensor 35 measures the temperature of the stator coil 34.

Next, principles of permanent magnet temperature estimation in the embodiment are described by using FIG. 2. In the embodiment, a harmonic voltage Vh is superimposed on the stator coil 34 and the temperature of the permanent magnet 32 is estimated based on a real part Rd of a harmonic impedance Zh which changes depending on a generated harmonic current value Ih. An equivalent circuit of the electric motor 2 can be illustrated as shown in FIG. 2, where Rc represents the resistance value of the stator coil, Lc represents the inductance of the stator coil, Rm represents the resistance value of the permanent magnet 32, and Lm represents the inductance of the permanent magnet 32. The harmonic impedance Zh is calculated from the harmonic voltage Vh and the harmonic current value Ih generated by superimposing the harmonic voltage Vh on the equivalent circuit, and is expressed by $Zh=Vh/Ih$. Moreover, the real part Rd of the harmonic impedance Zh is expressed by formula (1).

[Math 1]

$$R_d = \text{Re}(Z_h) = R_c + \frac{\omega^2 M^2(T_m, I_h) R_m(T_m)}{R_m^2(T_m) + \omega^2 L_m^2(T_m, I_h)} \quad (1)$$

In this formula, M represents a mutual inductance and ω represents an angular frequency of the harmonic voltage Vh. Moreover, the resistance value Rm and the inductance Lm of the permanent magnet 32 are functions of the temperature Tm of the permanent magnet 32. Accordingly, the resistance value Rm and the value of the inductance Lm of the permanent magnet 32 changes as the temperature Tm of the permanent magnet 32 changes. In other words, the real part Rd of the harmonic impedance Zh changes. As will be described later, there is a correlative relationship between the real part Rd of the harmonic impedance Zh and the temperature Tm of the permanent magnet 32. Accordingly, the temperature Tm of the permanent magnet 32 can be estimated based on the real part Rd of the harmonic impedance Zh obtained by superimposing the harmonic voltage Vh.

Configurations, functions, and operations of constitutional elements of the control device 1 for the electric motor 2 are sequentially described below based on FIG. 1.

A differential unit 3 subtracts detected fundamental wave currents idsf and iqsf respectively from current command values idsf* and iqsf* on d and q axes which are based on a torque command value, the detected fundamental wave currents idsf and iqsf obtained by cutting harmonics contents from detected currents ids and iqs actually flowing in the electric motor 2.

The current controller 4 performs a proportional-plus-integral control in such a way that a deviation between each of the current command values idsf* and iqsf* and a corresponding one of the detected fundamental wave currents idsf and iqsf are eliminated, and outputs first voltage command values vd0* and vq0*.

A differential unit 12 subtracts detected harmonic current values idsc and iqsc respectively from harmonic current command values idsc* and iqsc* received from the outside, the detected harmonic current values idsc and iqsc obtained by cutting fundamental wave contents from the detected currents ids and iqs actually flowing in the electric motor 2. The harmonic current command values idsc* and iqsc* are expressed by formula (2). In the embodiment, a harmonic signal superimposed on a fundamental wave for driving the electric motor 2 is given as a command value of the current.

[Math 2]

$$\begin{bmatrix} i_{dsc}^* \\ i_{qsc}^* \end{bmatrix} = \begin{bmatrix} I_c \sin \omega_c t \\ 0 \end{bmatrix} \quad (2)$$

In this formula, Ic represents the amplitude of the d-axis harmonic current command value idsc*, ωc represents the angular frequency of the d-axis harmonic current command value idsc*, and t represents time. The frequency of the d-axis harmonic current command value idsc* is different from the frequency of the fundamental wave. As is apparent from formula (2), in the embodiment, the harmonic current is superimposed on the d-axis component of the electric motor 2. Moreover, the amplitude Ic of the d-axis harmonic current command value idsc* is smaller than the amplitude of the fundamental wave.

The resonant controller 13 generates harmonic voltage command values vdsc* and vqsc* depending on the magnitude of the output of the differential unit 12. The resonant controller 13 can arbitrary set the amplitudes and intervals of the harmonic voltage command values vdsc* and vqsc*. The harmonic voltage command values vdsc* and vqsc* generated in the resonant controller 13 is expressed by formula (3). In the embodiment, a pulsating vector injection method is used in the superimposing of the harmonic voltage on the fundamental wave. The pulsating vector injection method is a method in which the harmonic voltage is superimposed on the d-axis component of the fundamental wave in directions parallel to the d axis (both of positive and negative directions).

[Math 3]

$$\begin{bmatrix} v_{dsc}^* \\ v_{qsc}^* \end{bmatrix} = \begin{bmatrix} (R_d + j\omega_c L_d) i_{dsc}^* \\ \omega_r L_d i_{dsc}^* \end{bmatrix} \quad (3)$$

In this formula, Rd represents a circuit resistance value including the coil resistance value of the stator and the permanent magnet resistant value. Note that the circuit resistance value also includes a resistance value of wiring between the electric motor 2 and the electric power converter 7. Ld represents a d-axis inductance and ωr represents the angular frequency of the rotor. In the embodiment, the q-axis component in the harmonic voltage command values vdsc* and vqsc* is cut and only the d-axis component is superimposed on the d-axis component of the electric motor 2. The q-axis component is cut because ωr is included in the q-axis harmonic voltage command value vqsc* in formula (3). Since ωr is the angular frequency of the rotor, the value of the q-axis harmonic voltage command value vqsc* changes depending on the angular frequency of the rotor. The q-axis component is cut to prevent such effects by the angular frequency of the rotor. Moreover, effects due to the q-axis inductance can be also prevented by cutting the q-axis component.

An adder 5 superimposes the harmonic voltage command values vdsc* and vqsc* on the first voltage command values vd0* and vq0* and outputs second voltage command values vds* and vqs*.

The coordinate transformation 6 performs coordinate conversion on the second voltage command values vds* and vqs* which are outputs of the adder 5, and outputs three-phase voltage command values vu*, vv*, and vw*.

The electric power converter 7 is, for example, an electric power converting circuit formed of a converter and an inverter and applies a three-phase voltage to the electric motor 2 on the basis of the three-phase voltage command values vu*, vv*, and vw*. Note that a voltage inverter or a current inverter can be used as the inverter. The electric motor 2 is driven by a three-phase current from the electric power converter 7 or performs regeneration.

The current detector 8 detects three-phase currents iu, iv, and iw flowing in the electric motor 2, by using a hole element or the like.

The coordinate transformation 11 performs coordinate conversion on the three-phase currents detected by the current detector 8 and outputs the detected currents ids and iqs on the d and q axes. The detected currents ids and iqs each include the fundamental wave component and the harmonic component. Thus, the fundamental wave component and the harmonic component included in each of the detected currents ids and iqs are separated by using the band-stop filter 9 and the band-pass filter 10. The band-stop filter 9 cuts the harmonic component from each of the detected currents ids and iqs and outputs the detected fundamental wave currents idsf and iqsf. Moreover, the band-pass filter 10 cuts the fundamental wave component from each of the detected currents ids and iqs and outputs the detected harmonic current values idsc and iqsc.

Figure 3:
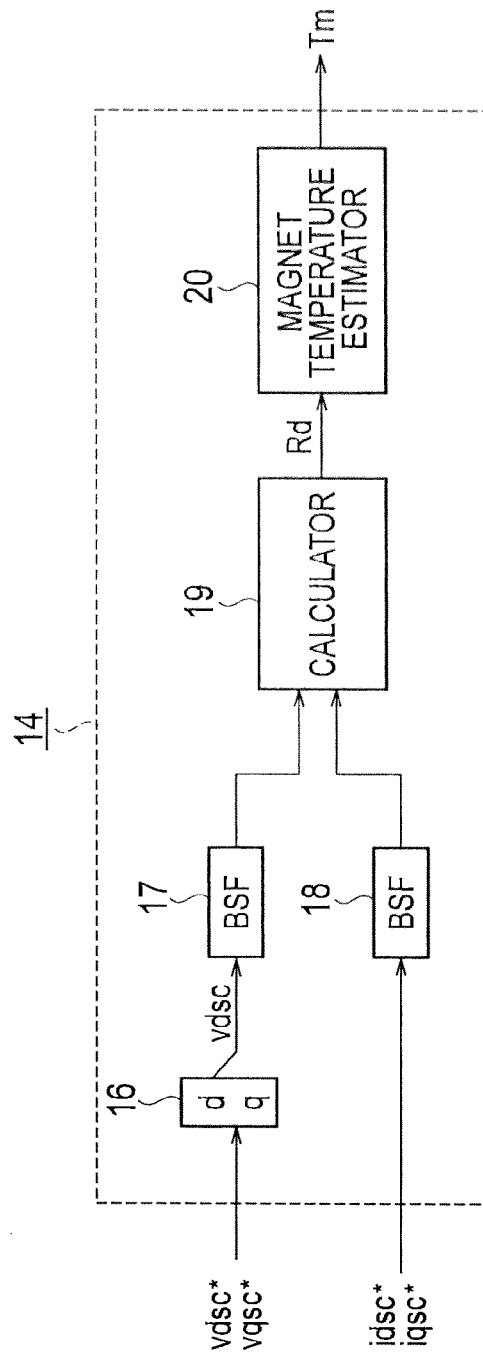
FIG. 3 is a configuration diagram of a magnet temperature estimating unit in the first embodiment of the present invention.

Next, the configuration, functions, and operations of the magnet temperature estimating unit 14 are described based on FIG. 3.

The magnet temperature estimating unit 14 includes a filter 16, band-stop filters 17 and 18, a calculator 19, and a magnet temperature estimator 20.

The filter 16 cuts the q-axis component in the harmonic voltage command values vdsc* and vqsc* and outputs a d-axis harmonic voltage value vdsc which is the d-axis component. The d-axis harmonic voltage value vdsc is a voltage obtained by superimposing the harmonic voltage command values vdsc* and vqsc* on the d-axis component of the electric motor 2. The d-axis harmonic voltage value vdsc is expressed by formula (4).

[Math 4]

$$\begin{bmatrix} v_{dsc} \\ v_{qsc} \end{bmatrix} = \begin{bmatrix} (R_d + j\omega_c L_d)i_{dsc}^* \\ 0 \end{bmatrix} \quad (4)$$

The band-stop filter 17 cuts a frequency component on a positive side or a negative side in the d-axis harmonic voltage value vdsc depending on the direction of rotation of the electric motor 2 and thereby extracts a frequency component on the positive side or the negative side.

Like the band-stop filter 17, the band-stop filter 18 cuts a frequency component on the positive side or the negative side and thereby extracts a frequency component on the positive side or the negative side.

The calculator 19 calculates a harmonic impedance Zds from the voltage value and the current value outputted from the band-stop filters 17 and 18. The calculated harmonic impedance Zds is expressed by formula (5).

[Math 5]

$$Z_{ds} = (R_d + j\omega_c L_d) = \frac{\frac{|v_{dsc}|}{2}e^{j(\omega_c t + \varphi_{zd})}}{\frac{I_c}{2}e^{j(\omega_c t)}} = \frac{\frac{|v_{dsc}|}{2}e^{j(-\omega_c t + \varphi_{zd})}}{\frac{I_c}{2}e^{j(-\omega_c t)}} \quad (5)$$

In this formula, $\varphi_{zd}$ represents a phase angle of the harmonic impedance Zds.

Next, the calculator 19 outputs the real part Rd of the harmonic impedance Zds obtained from formula (5).

Figure 4:
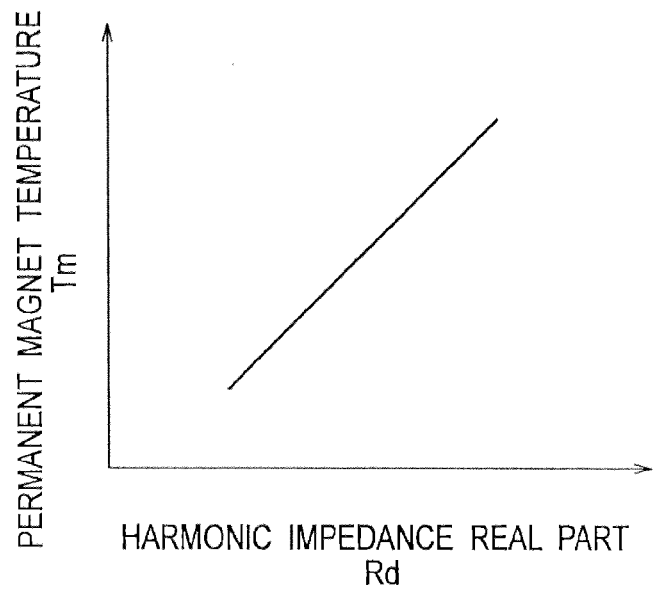
FIG. 4 is graph for explaining a relationship between a harmonic impedance real part and a permanent magnet temperature.

The magnet temperature estimator 20 estimates the temperature Tm of the permanent magnet by using the real part Rd of the harmonic impedance Zds outputted from the calculator 19. As shown in FIG. 4, there is a correlative relationship between the real part Rd of the harmonic impedance Zds and the temperature Tm of the permanent magnet. This relationship can be obtained through experiments and simulations in advance. The magnet temperature estimator 20 stores a map or a proportional coefficient which shows the relationship between the real part Rd of the harmonic impedance Zds and the temperature Tm of the permanent magnet and refers to the map and the real part Rd of the harmonic impedance Zds outputted from the calculator 19 to output the temperature Tm of the permanent magnet.

Figure 5:
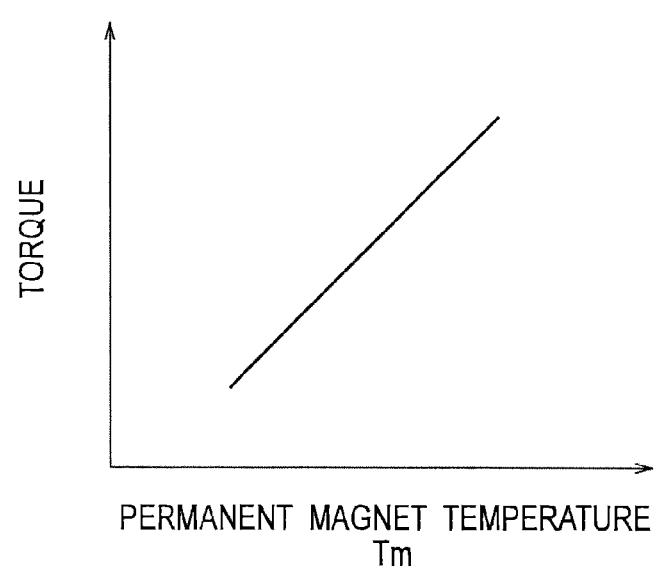
FIG. 5 is a graph explaining a relationship between a permanent magnet temperature and a torque.

The torque estimating unit 15 estimates the torque of the electric motor 2 from the temperature Tm of the permanent magnet outputted from the magnet temperature estimating unit 14. As shown in FIG. 5, there is a correlative relationship between the temperature Tm of the permanent magnet and the torque. This relationship can be obtained through experiments and simulations in advance. The torque estimating unit 15 stores a map showing the relationship between the temperature Tm of the permanent magnet and the torque and refers to the map and the temperature Tm of the permanent magnet outputted from the magnet temperature estimating unit 14 to calculate the torque.

As described above, in the torque estimating system of the embodiment, the d-axis harmonic current command value idsc* is superimposed only on the d-axis component of the fundamental wave in the pulsating vector injection method to obtain the d-axis harmonic voltage value vdsc not affected by the number of revolutions of the electric motor 2 and the q-axis inductance. The harmonic impedance Zds is calculated by using the d-axis harmonic current command value and the d-axis harmonic voltage and the temperature Tm of the permanent magnet is estimated based on the real part Rd of the thus-calculated harmonic impedance Zds. The temperature Tm of the permanent magnet can be thereby accurately estimated in a wide operation range from zero speed to a high number of revolutions of the electric motor 2. Moreover, since the torque can be calculated from the estimated temperature Tm of the permanent magnet, it is possible to accurately estimate the torque in the wide operation range from the low number of revolutions to the high number of revolutions of the electric motor 2, without using a torque sensor.

Moreover, in the torque estimating system of the embodiment, the d-axis harmonic current command value idsc* is superimposed at predetermined intervals. The temperature Tm of the permanent magnet may increase depending on the frequency and amplitude of the d-axis harmonic current command value idsc*. In the embodiment, the d-axis harmonic current command value idsc* is thus superimposed at predetermined intervals. This can suppress a loss of the electric motor 2 due to the d-axis harmonic current command value idsc* with a high estimation accuracy maintained for the temperature Tm of the permanent magnet. Since the temperature Tm of the permanent magnet can be accurately estimated, it is possible to accurately estimate the torque.

Furthermore, in the torque estimating system of the embodiment, the amplitude of the d-axis harmonic current command value idsc* is smaller than the amplitude of the fundamental wave. If the amplitude of the d-axis harmonic current command value idsc* is larger than the amplitude of the fundamental wave, not only the operations of the electric motor 2 is affected, but also the temperature Tm of the permanent magnet may increase. Thus, in the embodiment, the amplitude of the d-axis harmonic current command value idsc* is set to be smaller than the amplitude of the fundamental wave. This can suppress the loss of the electric motor 2 due to the d-axis harmonic current command value idsc* with a high estimation accuracy maintained for the temperature Tm of the permanent magnet. Since the temperature Tm of the permanent magnet can be accurately estimated, it is possible to accurately estimate the torque.

Moreover, in the torque estimating system of the embodiment, the harmonic impedance Zds can be obtained from the d-axis harmonic current command value idsc* and the d-axis harmonic voltage value vdsc obtained by superimposing the d-axis harmonic current command value idsc*. Accordingly, the temperature Tm of the permanent magnet can be easily estimated. Thus, the torque can be easily estimated.

Furthermore, in the torque estimating system of the embodiment, the detected harmonic current values idsc and iqsc are separated from the fundamental wave by using the band-stop filter 9 and the band-pass filter 10. This makes it possible to extract the harmonic component at a high accuracy and accurately estimate the temperature Tm of the permanent magnet. Accordingly, the torque can be accurately estimated.

Moreover, in the torque estimating system of the embodiment, a frequency component on a different side from the rotating direction of the synchronous electric motor is extracted from the d-axis harmonic current command value idsc* and the d-axis harmonic voltage value vdsc by using the band-stop filters 17 and 18. Due to this, the positive and negative of the frequencies of the fundamental wave and the d-axis harmonic current command value idsc* are different from each other even in case where the frequencies are the same. Thus, the temperature Tm of the permanent magnet can be accurately estimated without increasing the frequency of the harmonic even in an electric motor with a wide range of the number of revolutions. Accordingly, the torque can be accurately estimated.

Next, a modified example 1 of the first embodiment is described.

Figure 6:
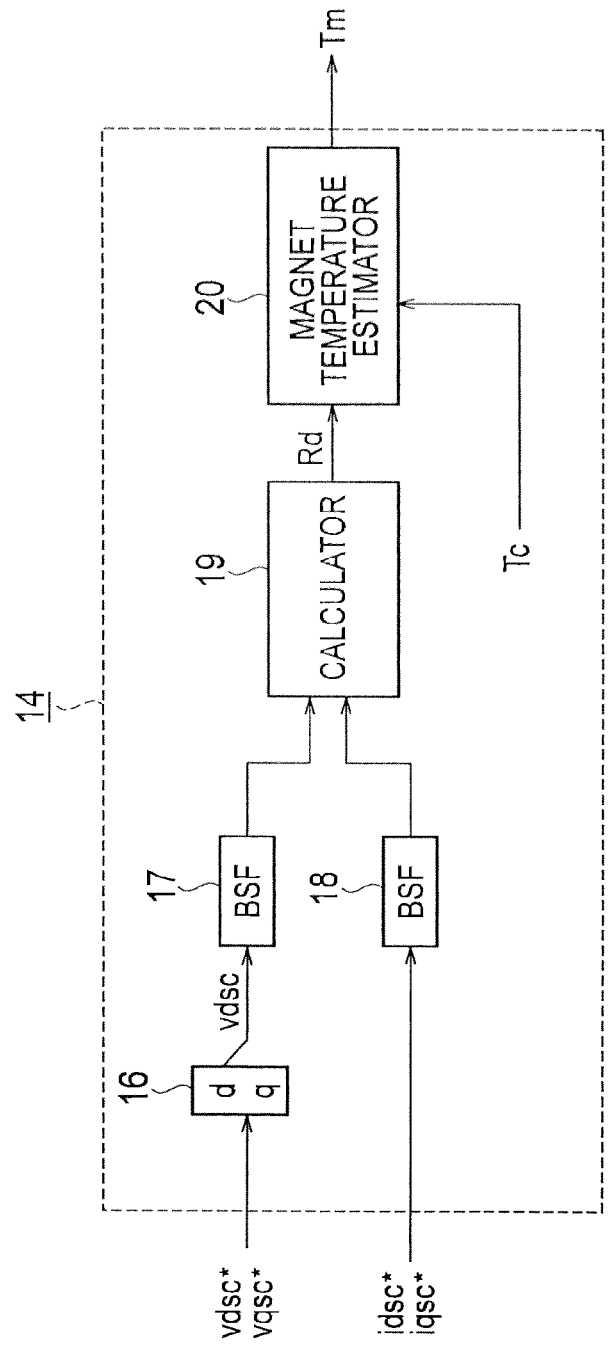
FIG. 6 is a configuration diagram of a modified example 1 of the magnet temperature estimating unit in the first embodiment of the present invention.
Figure 7:
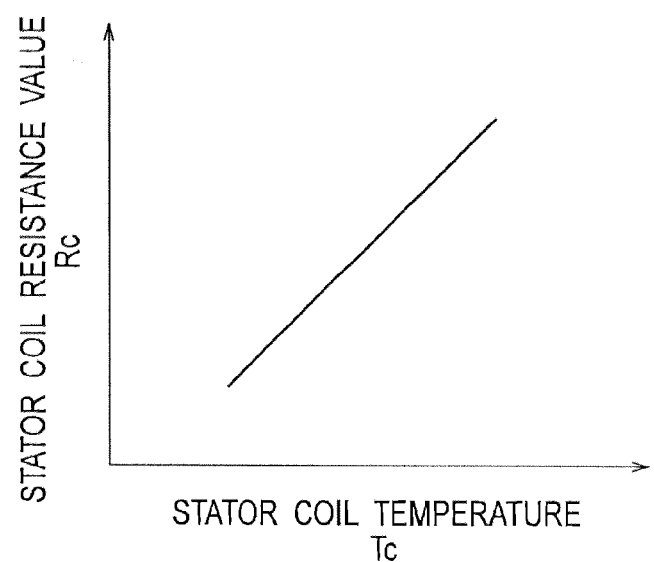
FIG. 7 is a graph explaining a relationship between a stator coil temperature and a stator coil resistance value.

FIG. 6 is a configuration diagram of the modified example 1 of the magnet temperature estimating unit 14. As shown in FIG. 6, in the modified example 1, the magnet temperature estimating unit 14 estimates the temperature Tm of the permanent magnet in consideration of a coil temperature Tc of the stator. For example, the coil temperature Tc of the stator can be obtained from the temperature sensor 35 attached to the stator coil 34 as shown in FIG. 2. There is a correlative relationship between the coil temperature Tc and the coil resistance value Rc of the stator as shown in FIG. 7. This relationship can be obtained through experiments and simulations in advance. The magnet temperature estimator 20 stores a map showing the relationship between the coil temperature Tc and the coil resistance value Rc of the stator and can estimate the coil resistance value Rc of the stator by referring to the map and the inputted coil temperature Tc of the stator. Since the coil resistance value Rc of the stator is included in the real part Rd of the harmonic impedance Zh, correcting the coil resistance value Rc of the stator by using the coil temperature Tc of the stator enables the real part Rd of the harmonic impedance Zds including the corrected coil resistance value Rc to be accurately obtained. Thus, since the temperature Tm of the permanent magnet can be accurately estimated, it is possible to accurately estimate the torque.

Next, a modified example 2 of the first embodiment is described.

Figure 8:
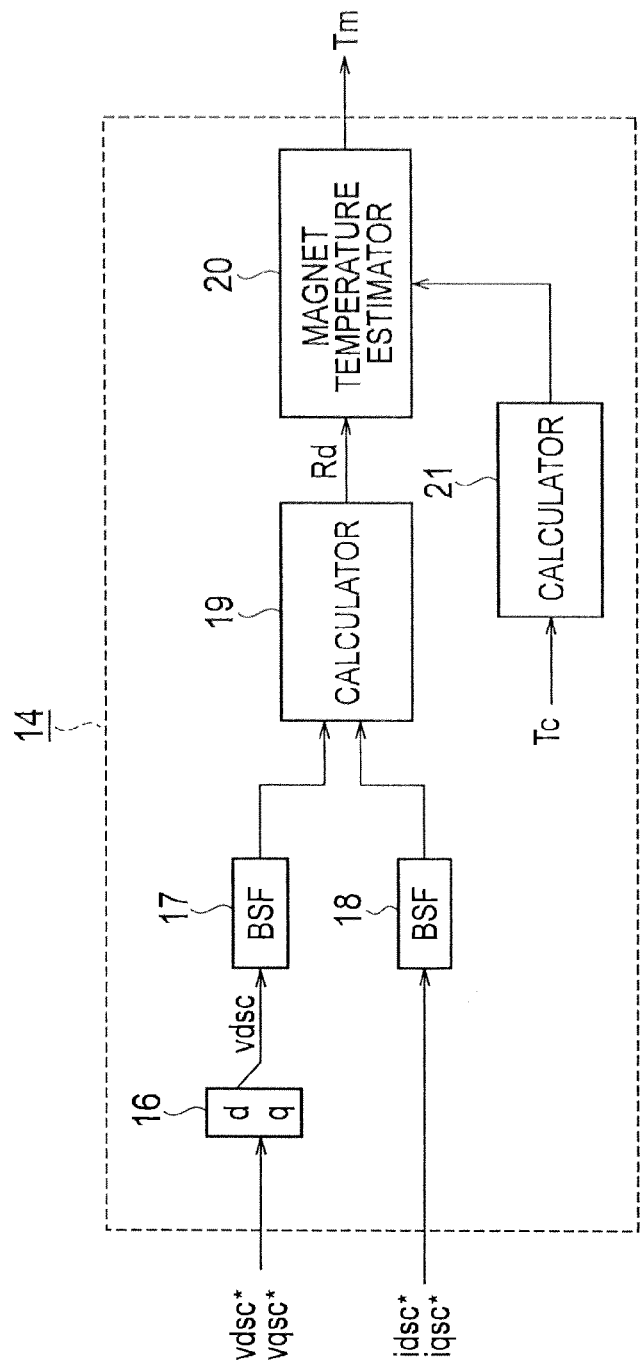
FIG. 8 is a configuration diagram of a modified example 2 of the magnet temperature estimating unit in the first embodiment of the present invention.

FIG. 8 is a configuration diagram of the modified example 2 of the magnet temperature estimating unit 14. The modified example 2 is different from the modified example 1 in that the resistance value Rc of the stator is estimated not by using the map but through calculation by a calculator 21. Assume a case where the coil temperature of the stator changes from T0 to T1 and Rc represents the resistance value at the coil temperature of T0 while Rc' represents the resistance value at the coil temperature of T1. In this case, Rc' is expressed as $Rc'=Rc(1+\alpha \times (T1-T0))$. In this formula, $\alpha$ represents a resistance temperature coefficient. As described above, in the modified example 2, correcting the coil resistance value Rc of the stator by using the coil temperature of the stator enables the real part Rd of the harmonic impedance Zds including the corrected coil resistance value Rc to be accurately obtained without using the map as in the modified example 1. Thus, since the temperature Tm of the permanent magnet can be accurately estimated, it is possible to accurately estimate the torque.

Next, a modified example 3 of the first embodiment is described.

Figure 9:
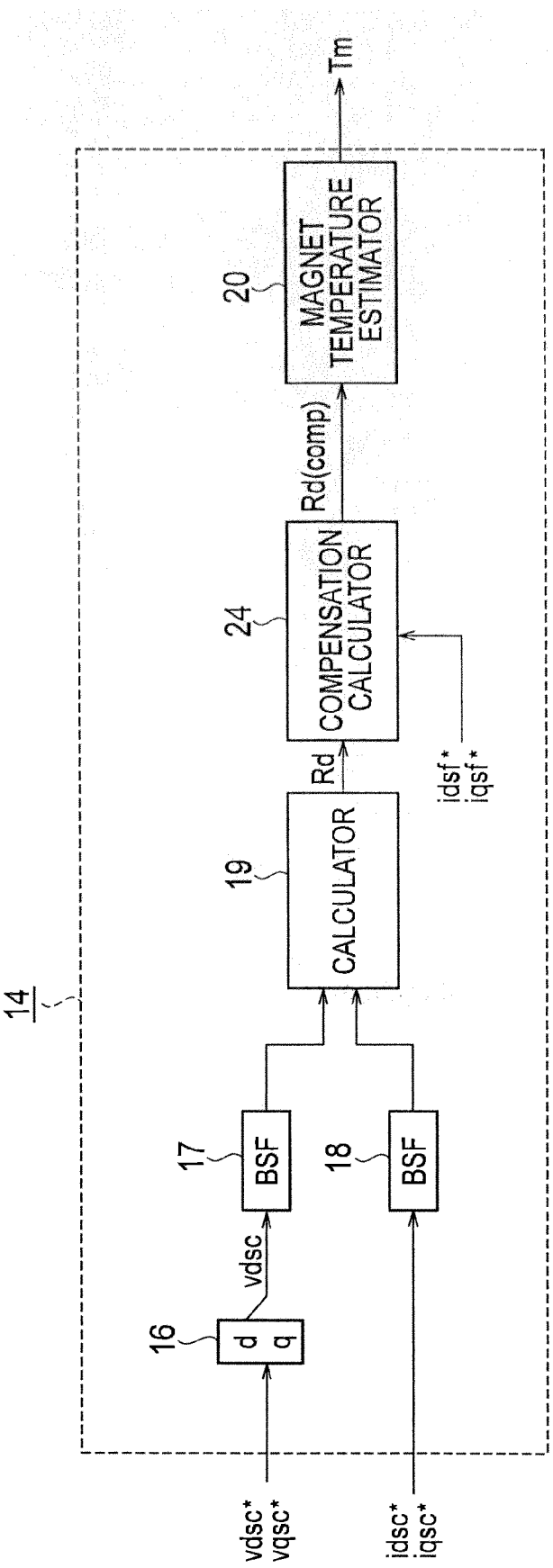
FIG. 9 is a configuration diagram of a modified example 3 of the magnet temperature estimating unit in the first embodiment of the present invention.

FIG. 9 is a configuration diagram of the modified example 3 of the magnet temperature estimating unit 14. The modified example 3 is different from the modified examples 1 and 2 in that, as shown in FIG. 9, the magnet temperature estimating unit 14 includes a compensation calculator 24. The compensation calculator 24 compensates the real part Rd of the harmonic impedance Zds by using fundamental wave current values id and iq. A highly-accurate real part Rd (comp) of the harmonic impedance Zds can be thereby obtained. In the modified example 3, the current command values idsf* and iqsf* are used as the fundamental wave current values id and iq. However, the fundamental wave current values id and iq are not limited to these values.

Figure 10:
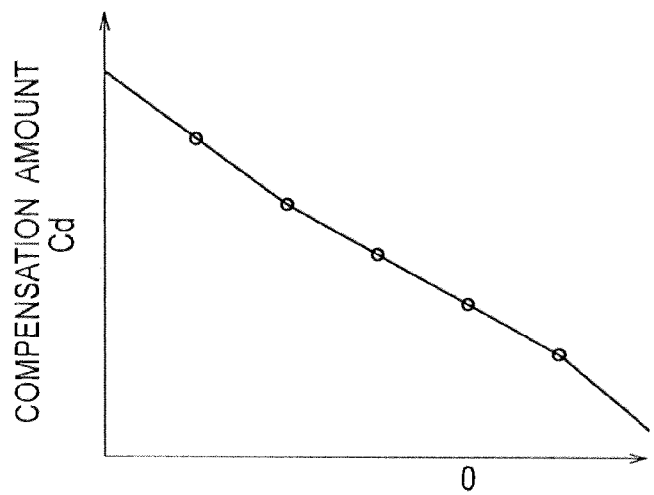
FIG. 10 is a graph for explaining a relationship between a d-axis fundamental wave current value and a compensation amount for compensating the harmonic impedance real part.
Figure 11:
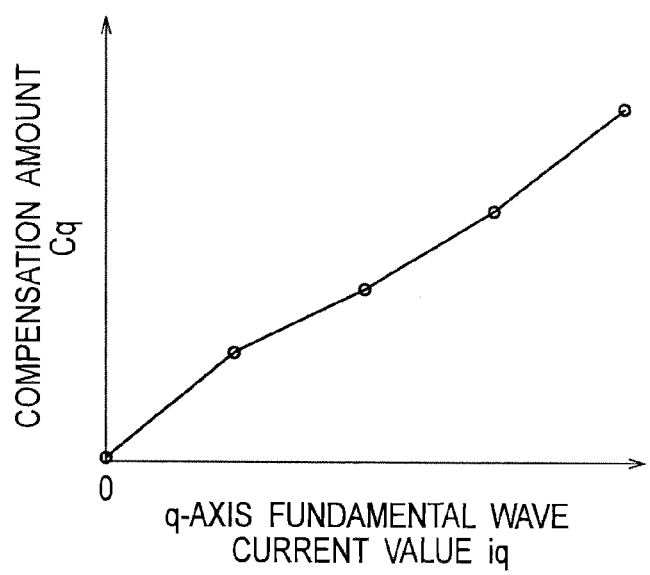
FIG. 11 is a graph for explaining a relationship between a q-axis fundamental wave current value and a compensation amount for compensating the harmonic impedance real part.

Next, with reference to FIGS. 10 and 11, description is given of a method of compensating the real part Rd of the harmonic impedance Zds by using the fundamental wave current values id and iq. FIG. 10 is a relationship between the d-axis fundamental wave current value id and a compensation amount Cd for compensating the real part Rd of the harmonic impedance Zds. FIG. 11 is a relationship between a q-axis fundamental wave current value iq and a compensation amount Cq for compensating the real part Rd of the harmonic impedance Zds. As shown in FIGS. 10 and 11, there is a correlative relationship between each of the fundamental wave current values id and iq and a corresponding one of the compensation amounts Cd and Cq for compensating the real part Rd of the harmonic impedance Zds. Accordingly, when each of the graphs shown in FIGS. 10 and 11 are subjected to linear interpolation, the inclination of the graph can be considered as constant. Here, assume that αd represents the magnitude of the inclination of a line segment in a case where the graph shown in FIG. 10 is subjected to linear interpolation, αq represents the magnitude of the inclination of a line segment in a case where the graph shown in FIG. 11 is subjected to linear interpolation, and Rd(comp) represents the real part Rd of the harmonic impedance Zds after compensation. In this case, Rd(comp) is expressed by $Rd(comp)=Rd-Iq \times \alpha q + Id \times \alpha d$. Since the inclinations αd and αq are known, the real part Rd(comp) of the harmonic impedance Zds after compensation can be obtained by inputting the fundamental wave current values id and iq.

As described above, in the modified example 3, it is possible to compensate the real part Rd of the harmonic impedance Zds by using the fundamental wave current values id and iq and obtain a highly-accurate real part Rd(comp). Then, the temperature Tm of the permanent magnet can be accurately estimated by using the highly-accurate real part Rd(comp) of the harmonic impedance Zds. Accordingly, the torque can be accurately estimated. Note that the coil temperature Tc of the stator shown in the modified example 1 or 2 can be also taken in consideration in the modified example 3.

[Second Embodiment]

Next, a second embodiment of the present invention is described.

The second embodiment is different from the first embodiment in that a d-axis component of a fundamental wave is superimposed on a harmonic voltage instead of a harmonic current. Description of points which are the same as the first embodiment is omitted and points different from the first embodiment are mainly described below.

Figure 12:
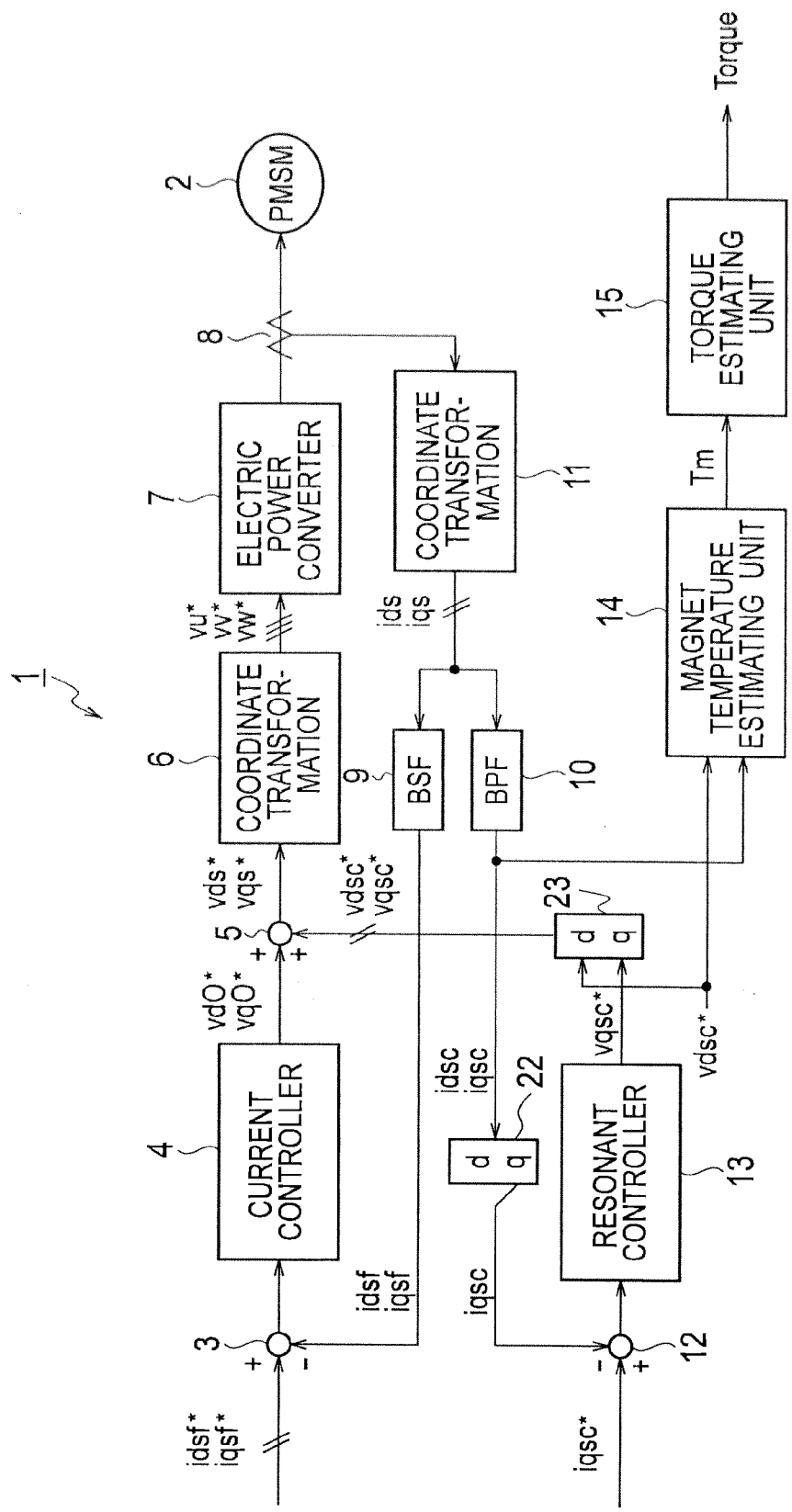
FIG. 12 is a system configuration diagram of a control device for a permanent magnet synchronous electric motor in a second embodiment of the present invention.

FIG. 12 is a system configuration diagram of a control device 1 for a permanent magnet synchronous electric motor in the second embodiment.

A filter 22 cuts the d-axis component in detected harmonic current values idsc and iqsc outputted from the band-pass filter 10 and outputs the q-axis detected harmonic current value iqsc which is a q-axis component.

A differential unit 12 subtracts the q-axis detected harmonic current value iqsc from a q-axis harmonic current command value iqsc* received from the outside. The q-axis harmonic current command value iqsc* received from the outside is expressed by formula (6).

[Math 6]

$$i_{qsc}^* = 0 \tag{6}$$

In the embodiment, the q-axis harmonic current command value iqsc* is set to 0 so that no harmonic current is superimposed on the q-axis component of the fundamental wave. Accordingly, a q-axis harmonic voltage command value vqsc* generated in a resonant controller 13 is also 0. An adder 23 adds a d-axis harmonic voltage command value vdsc* received from the outside and q-axis harmonic voltage command value vqsc* outputted from the resonant controller 13. The d-axis harmonic voltage command value vdsc* is expressed by formula (7).

[Math 7]

$$v_{dsc}^* = V_c \cos \omega_c t \tag{7}$$

In this formula, Vc represents amplitude.

An adder 5 superimposes the harmonic voltage command values vdsc* and vqsc* on first voltage command values vd0* and vq0* and outputs second voltage command values vds* and vqs*. Since the q-axis harmonic voltage command value vqsc* is 0, the adder 5 superimposes the d-axis harmonic voltage command value vdsc* only on the d-axis component of the fundamental wave. This can prevent effects due to a q-axis inductance. Moreover, the method of superimposing the d-axis harmonic voltage command value vdsc* is a pulsating vector injection method as in the first embodiment. A harmonic current in which effects of the number of revolutions of an electric motor 2 are suppressed can be thereby obtained. Harmonic current values idsc and iqsc obtained by superimposing the d-axis harmonic voltage command value vdsc* only on the d-axis component of the fundamental wave are outputted via the band-pass filter 10 and is expressed by formula (8).

[Math 8]

$$\begin{bmatrix} i_{dsc} \\ i_{qsc} \end{bmatrix} = \begin{bmatrix} v_{dsc}^*/(R_d + j\omega_c L_d) \\ 0 \end{bmatrix} \tag{8}$$

Figure 13:
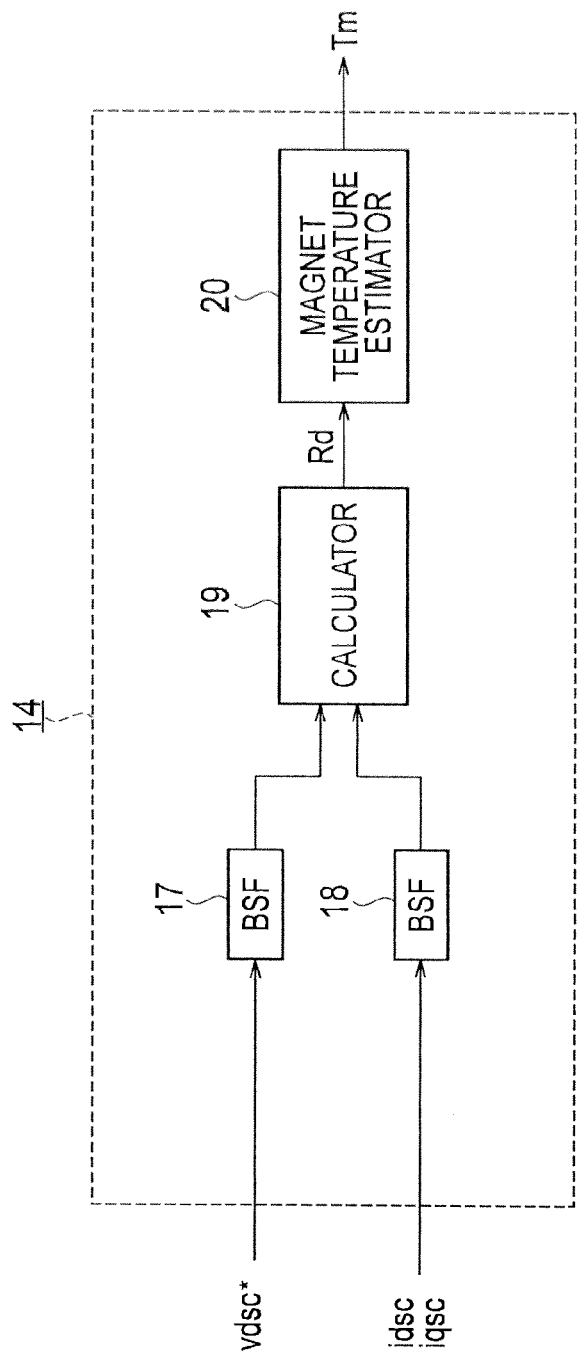
FIG. 13 is a configuration diagram of a magnet temperature estimating unit in the second embodiment of the present invention.

As shown in FIG. 13, a calculator 19 calculates a harmonic impedance Zds on the basis of formulae (7) and (8) shown above. The harmonic impedance Zds is expressed by formula (9).

[Math 9]

$$Z_{ds} = (R_d + j\omega_c L_d) = \frac{\frac{V_c}{2} e^{j(-\omega_c t)}}{\frac{|i_{dsc}|}{2} e^{j(\omega_c t - \varphi_{zd})}} = \frac{\frac{V_c}{2} e^{j(\omega_c t)}}{\frac{|i_{dsc}|}{2} e^{j(-\omega_c t - \varphi_{zd})}} \tag{9}$$

Next, the calculator 19 outputs the real part Rd of the harmonic impedance Zds obtained from formula (9).

The magnet temperature estimator 20 estimates the temperature Tm of the permanent magnet by using the real part Rd of the harmonic impedance Zds outputted from the calculator 19.

As described above, in the embodiment, the d-axis harmonic voltage command value vdsc* is superimposed only on the d-axis components of the fundamental wave in the pulsating vector injection method and the d-axis harmonic current value idsc in which the effects of the number of revolutions of the electric motor 2 are suppressed can be obtained. The harmonic impedance Zds is calculated by using the d-axis harmonic voltage command value vdsc* and the d-axis harmonic current value idsc and the temperature Tm of the permanent magnet is estimated based on the real part Rd of the thus-calculated harmonic impedance Zds. The temperature Tm of the permanent magnet can be thereby accurately estimated in a wide operation range from zero speed to a high number of revolutions of the electric motor 2. Moreover, since the torque can be calculated from the estimated temperature Tm of the permanent magnet, it is possible to accurately estimate the torque in the wide operation range from the low number of revolutions to the high number of revolutions of the electric motor 2, without using a torque sensor. Note that a coil resistance value Rc can be corrected by using a coil temperature Tc of the stator as in the first embodiment. Moreover, the real part Rd of the harmonic impedance Zds can be compensated by using fundamental wave current values id and iq as in the first embodiment.

The entire content of European Patent Application No. 14380001.9 (filed on Jan. 13, 2014) is incorporated herein by reference.

The contents of the present invention have been described above by using the embodiments. However, the present invention is not limited to the above description and it is apparent to those skilled in the art that various modifications and improvements can be made.

What is claimed is:

1. A torque estimating system for a synchronous electric motor having a permanent magnet comprising:
    a superimposing unit configured to superimpose a voltage or current of a frequency different from a frequency of a fundamental wave driving the synchronous electric motor on at least a d-axis of the synchronous electric motor;
    a magnet temperature estimating unit configured to estimate a temperature of the permanent magnet from the superimposed voltage or current and a current or voltage obtained by the superimposing;
    a torque estimating unit configured to estimate a torque of the synchronous electric motor from the estimated temperature of the permanent magnet;
    a calculator configured to calculate an impedance of the synchronous electric motor from the superimposed voltage or current and the current or voltage obtained by the superimposing; and a temperature measuring unit configured to measure a temperature of a stator coil of the synchronous electric motor, wherein when the superimposing unit superimposes the voltage or current of the frequency different from the frequency of the fundamental wave on the synchronous electric motor, the calculator corrects a resistance value of the stator coil included in the impedance depending on the temperature of the stator coil measured by the temperature measuring unit and the magnet temperature estimating unit estimates the temperature of the permanent magnet on the basis of the impedance including the corrected resistance value of the stator coil.

2. The torque estimating system for the synchronous electric motor according to claim 1, wherein the superimposing unit superimposes the voltage or current of the frequency different from the frequency of the fundamental wave only on the d-axis of the synchronous electric motor.

3. The torque estimating system for the synchronous electric motor according to claim 1, wherein the superimposing unit superimposes the voltage or current of the frequency different from the frequency of the fundamental wave at predetermined intervals.

4. The torque estimating system for the synchronous electric motor according to claim 1, wherein the torque estimating unit estimates the torque on the basis of the estimated temperature of the permanent magnet and a pre-obtained relationship between the temperature of the permanent magnet and the torque of the synchronous electric motor.

5. The torque estimating system for the synchronous electric motor according to claim 1, wherein the calculator corrects the resistance value of the stator coil included in the impedance on the basis of the temperature of the stator coil measured by the temperature measuring unit and a pre-obtained relationship between the temperature of the stator coil and the resistance value of the stator coil, and the magnet temperature estimating unit estimates the temperature of the permanent magnet on the basis of the impedance including the corrected resistance value of the stator coil.

6. The torque estimating system for the synchronous electric motor according to claim 1, wherein the synchronous electric motor is driven by a current inverter, the superimposing unit superimposes a current expressed by a formula (1) shown below on the synchronous electric motor, the calculator uses a voltage which is obtained by superimposing the current expressed by the formula (1) shown below on the synchronous electric motor and which is expressed by a formula (2) shown below, to calculate the impedance expressed by a formula (3) shown below and obtained from the following formulae (1) and (2), wherein $$\begin{bmatrix} i_{dsc}^* \\ i_{qsc}^* \end{bmatrix} = \begin{bmatrix} I_c \sin \omega_c t \\ 0 \end{bmatrix} \quad (1)$$

where $i_{dsc}^*$ represents a d-axis harmonic current command value;

$i_{qsc}^*$ represents a q-axis harmonic current command value;

$I_c$ represents an amplitude of d-axis harmonic current command value;

$\omega_c$ represents an angular frequency of d-axis harmonic current command value; and t represents a time, $$\begin{bmatrix} v_{dsc} \\ v_{qsc} \end{bmatrix} = \begin{bmatrix} (R_d + j\omega_c L_d) i_{dsc}^* \\ 0 \end{bmatrix} \quad (2)$$

where $v_{dsc}$ represents a d-axis harmonic voltage value;

$v_{qsc}$ represents a q-axis harmonic voltage value;

$R_d$ represents a circuit resistance value including coil resistance value and magnet resistance value;

$L_d$ represents a d-axis inductance; and $\omega_c$, represents an angular frequency of d-axis harmonic current command value, $$Z_{ds} = (R_d + j\omega_c L_d) = \frac{\frac{|v_{dsc}|}{2} e^{j(\omega_c t + \varphi_{zd})}}{\frac{I_c}{2} e^{j(\omega_c t)}} = \frac{\frac{|v_{dsc}|}{2} e^{j(-\omega_c t + \varphi_{zd})}}{\frac{I_c}{2} e^{j(-\omega_c t)}} \quad (3)$$

where $Z_{ds}$ represents impedance;

$R_d$ represents the circuit resistance value including coil resistance value and magnet resistance value;

$L_d$ represents the d-axis inductance;

$\omega_c$ represents the angular frequency of d-axis harmonic current command value;

$v_{dsc}$ represents the d-axis harmonic voltage value;

$\varphi_{zd}$ represents a phase angle of impedance;

$I_c$, represents the amplitude of d-axis harmonic current command value; and t represents the time.

7. The torque estimating system for the synchronous electric motor according to claim 1, wherein the synchronous electric motor is driven by a voltage inverter, the superimposing unit superimposes a voltage expressed by a formula (4) shown below on the synchronous electric motor, the calculator uses a current which is obtained by superimposing the voltage expressed by the formula (4) shown below on the synchronous electric motor and which is expressed by a formula (5) shown below, to calculate the impedance expressed by a formula. (6) shown below and obtained from the following formulae (4) and (5), wherein $$v_{dsc}^* = V_c \cos \omega_c t \ldots \quad (4)$$

where $V_{dsc}^*$ represents a d-axis harmonic voltage command value;

$V_c$ represents an amplitude of d-axis harmonic voltage command value;

$\omega_c$ represents an angular frequency of d-axis harmonic voltage command value; and t represents a time, $$\begin{bmatrix} i_{dsc} \\ i_{qsc} \end{bmatrix} = \begin{bmatrix} v_{dsc}{}^*/(R_d + j\omega_c L_d) \\ 0 \end{bmatrix} \quad (5)$$

where $i_{dsc}$ represents a d-axis harmonic current value;

$i_{qsc}$ represents a q-axis harmonic current value;

$V^{dsc}$ * represents the d-axis harmonic voltage command value;

$R_d$ represents a circuit resistance value including coil resistance value and magnet resistance value;

$L_d$ represents a d-axis inductance; and $\omega_c$ represents an angular frequency of d-axis harmonic voltage command value, $$Z_{ds} = (R_d + j\omega_c L_d) = \frac{\frac{V_c}{2} e^{j(-\omega_c t)}}{\frac{|i_{dsc}|}{2} e^{j(\omega_c t - \varphi_{zd})}} = \frac{\frac{V_c}{2} e^{j(\omega_c t)}}{\frac{|i_{dsc}|}{2} e^{j(-\omega_c t - \varphi_{zd})}} \quad (6)$$

where $Z_{ds}$ represents impedance;

$R_d$ represents the circuit resistance value including coil resistance value and magnet resistance value;

$L_d$ represents the d-axis inductance;

$\omega_c$ represents the angular frequency of d-axis harmonic voltage command value;

$V_c$ represents the amplitude of d-axis harmonic voltage command value;

$\varphi_{zd}$ represents a phase angle of impedance;

$i_{dsc}$ represents the d-axis harmonic current value; and t represents the time.

8. The torque estimating system for the synchronous electric motor according to claim 1, further comprising:
a band-pass filter and a band-stop filter Which separate the fundamental wave and the voltage or current of the frequency different from the frequency of the fundamental wave. from each other, wherein
the calculator calculates the impedance on the basis of the separated voltage or current.

9. The torque estimating system for the synchronous electric motor according to claim 8, further comprising:
a second band-stop filter configured to extract a frequency component on a different side from a rotating direction of the synchronous electric motor from the separated voltage or current, wherein
the calculator calculates the impedance on the basis of the extracted voltage or current.

10. The torque estimating system for the synchronous electric motor according to claim 1, further comprising:
a compensation calculator configured to compensate the calculated impedance, wherein
the magnet temperature estimating unit estimates the temperature of the permanent magnet on the basis of the compensated impedance.

11. The torque estimating system for the synchronous electric motor according to claim 10, wherein
the compensation calculator compensates the calculated impedance by using at least one of a pre-obtained relationship between a d-axis fundamental wave current and a compensation amount for compensating the calculated impedance or a pre-obtained relationship between a q-axis fundamental wave current and a compensation amount for compensating the calculated impedance.

12. A torque estimating system for a synchronous electric motor having a permanent magnet comprising:
superimposing means for superimposing a voltage or current of a frequency different from a frequency of a fundamental wave driving the synchronous electric motor on at least a d-axis of the synchronous electric motor;
magnet temperature estimating means for estimating a temperature of the permanent magnet from the superimposed voltage or current and a current or voltage obtained by the superimposing; and
torque estimating means for estimating a torque of the synchronous electric motor from the estimated temperature of the permanent magnet;
calculation means for calculating an impedance of the synchronous electric motor from the superimposed voltage or current and the current or voltage obtained by the superimposing; and
temperature measuring means for measuring a temperature of a stator coil of the synchronous electric motor, wherein
when the superimposing means superimposes the voltage or current of the frequency different from the frequency of the fundamental wave on the synchronous electric motor, the calculation means corrects a resistance value of the stator coil included in the impedance depending on the temperature of the stator coil measured by the temperature measuring means and the magnet temperature estimating means estimates the temperature of the permanent magnet on the basis of the impedance including the corrected resistance value of the stator coil.

* * * * *